Figure 1:
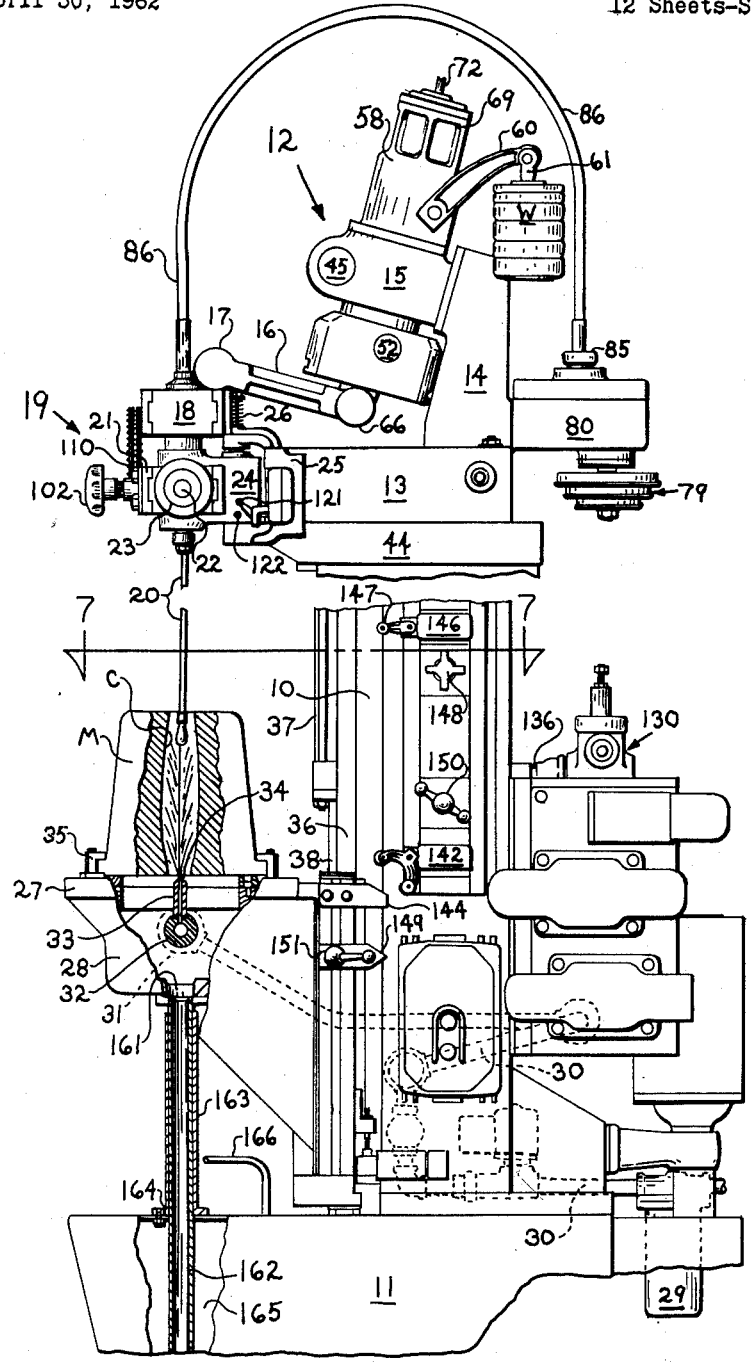

Feb. 18, 1964    R. O. EKSTROM    3,121,296
MOLD POLISHING MACHINE
Filed April 30, 1962    12 Sheets-Sheet 1

INVENTOR.
ROBERT O. EKSTROM
BY J. R. Nelson
and W. A. Schaich
ATTORNEYS

INVENTOR.
ROBERT O. EKSTROM
ATTORNEYS

Feb. 18, 1964 R. O. EKSTROM 3,121,296
MOLD POLISHING MACHINE
Filed April 30, 1962 12 Sheets-Sheet 7

INVENTOR.
ROBERT O EKSTROM
BY
ATTORNEYS

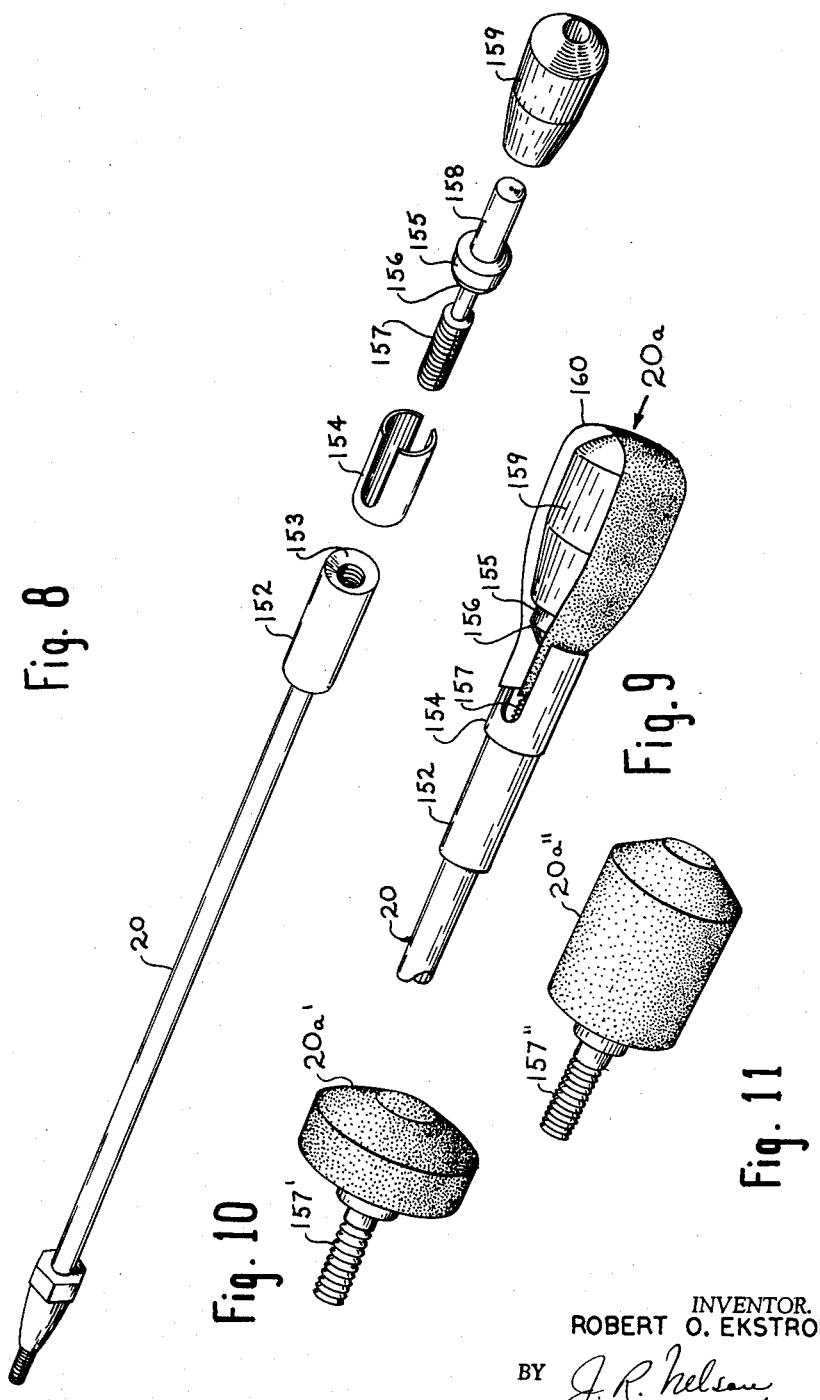

INVENTOR.
ROBERT O. EKSTROM

Feb. 18, 1964    R. O. EKSTROM    3,121,296
MOLD POLISHING MACHINE
Filed April 30, 1962    12 Sheets-Sheet 12

INVENTOR.
ROBERT O. EKSTROM
ATTORNEYS

United States Patent Office 3,121,296
Patented Feb. 18, 1964

3,121,296
MOLD POLISHING MACHINE
Robert O. Ekstrom, Streator, Ill., assignor to Owens-Illinois Glass Company, a corporation of Ohio
Filed Apr. 30, 1962, Ser. No. 190,871
21 Claims. (Cl. 51—34)

The present invention relates to apparatus for polishing the interior wall surface of a mold, and particularly a glass shaping mold having an interior cavity that is generally open at its opposite axial ends.

The mold, as is the general case, is made in two complementary parts or sections which meet, when the sections are in "closed" position, along a mold seam or parting line. This is generally along a longitudinal plane that passes through the axis or center of the cavity.

After these molds have been used for a time on a glassware forming machine in shaping hot, plastic glass, they become corroded or scaled or otherwise blemished. Molten glass, as it is undergoing shaping, has a high abrasive quality. Many of these molds are plural cavity having as many cavities as three. Heretofore, the molds have been reconditioned by hand polishing of the cavities using a hand manipulated, power operated, polishing tool. Before hand polishing, they are grit blasted, such as in a sand blasting apparatus. However, this hand polishing technique often results in non-uniform polishing of a cavity or non-uniformity as between cavities of the molds. It also consumes considerable time and man power.

In hand polishing mold cavities of split or two-piece glass blank molds, the half sections of the mold are polished individually by the polisher. In so doing, the mold seams are exposed and may be, and often are, polished or beveled. This is undesirable because if the mating mold seam faces are ground off or beveled, a resultant scar or exaggerated seam on the glass parison will result in use of the mold on a glass forming machine.

It is, therefore, an object of the invention to provide a polishing apparatus wherein the two-piece or split molds may be polished in a closed or juxtapositioned relationship, thereby protecting the mold seams and overcoming the above-mentioned difficulty.

The present invention has for another of its objects the provision of apparatus for polishing mold cavities, or the like, that is faster, more economical, and more accurate, yet provides uniformity of polishing in a cavity and between different cavities.

Another object of the invention is to provide automatic polishing apparatus that will cycle a polishing tool along the mold cavity and orbit the tool about the periphery of the cavity while applying a substantially uniform polishing pressure by the tool against the cavity wall.

And, a further object is to provide such a polishing apparatus that will be controlled to automatically polish one or more cavities of a mold uniformly.

Another provision of this invention is a novel drive mechanism for orbiting a polishing tool to the contour of a cavity to be polished, but without use of a profile, template or pattern as a guide, the orbital drive mechanism applying a substantially uniform outward pressure of the polishing tool against the cavity wall as it is orbited around the cavity.

A still further object of the invention is to provide certain safety features on the automatic polishing machine so that it will automatically shut itself down should any mechanical interference occur as between the mold workpiece and the polishing mechanism, and thereby prevent inflicting damage to the workpiece or to the polishing apparatus.

Another object is to provide a novel polishing assembly for attaching an abrasive material thereon, and for quick change of the abrasive after it has become worn.

Other objects and advantages thereof will become apparent to those skilled in the art from the following detailed description, taken in conjunction with the annexed sheets of drawings, on which, by way of preferred example only, are illustrated two embodiments of this invention.

Figure 2:
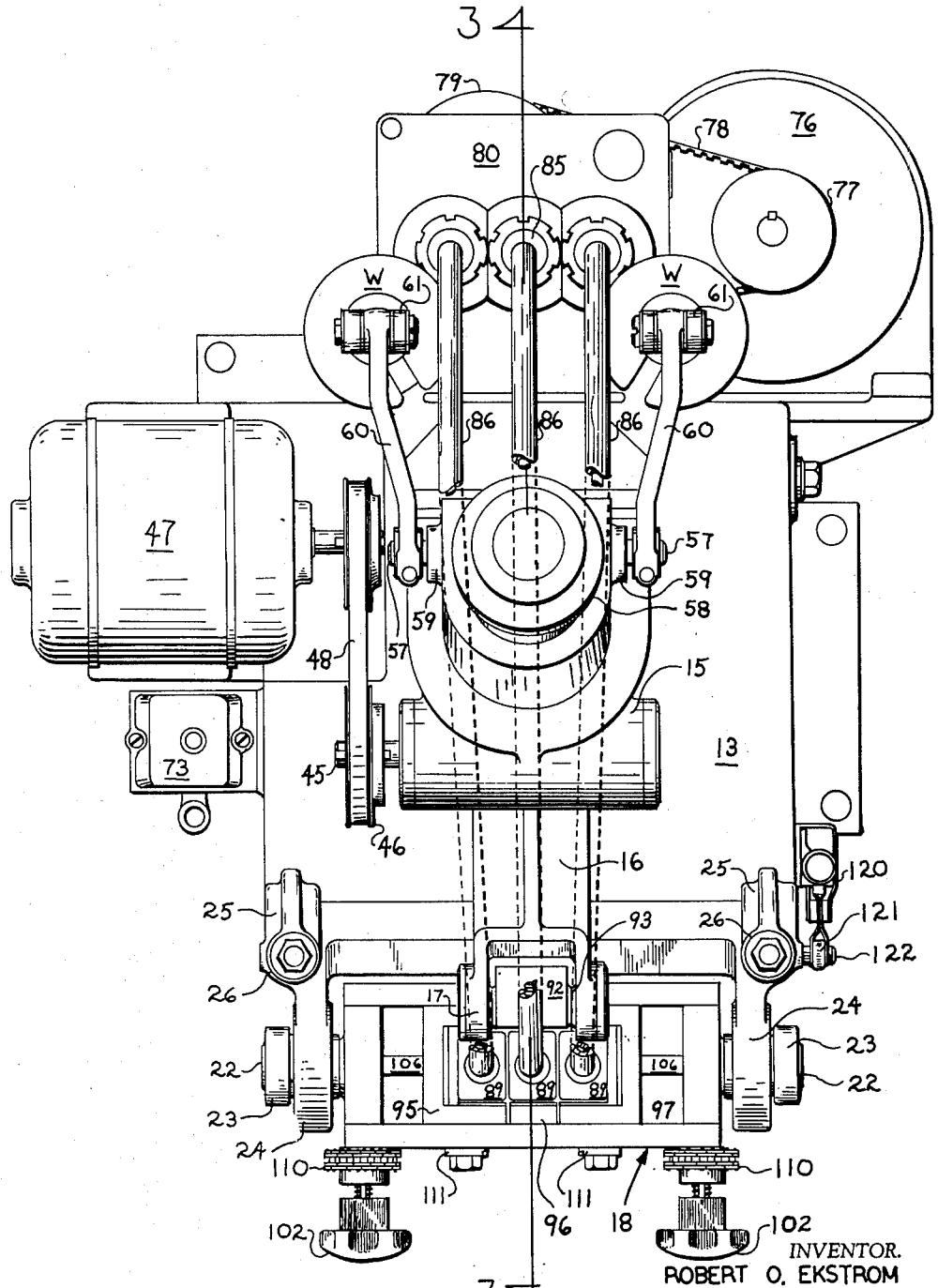
Figure 3:
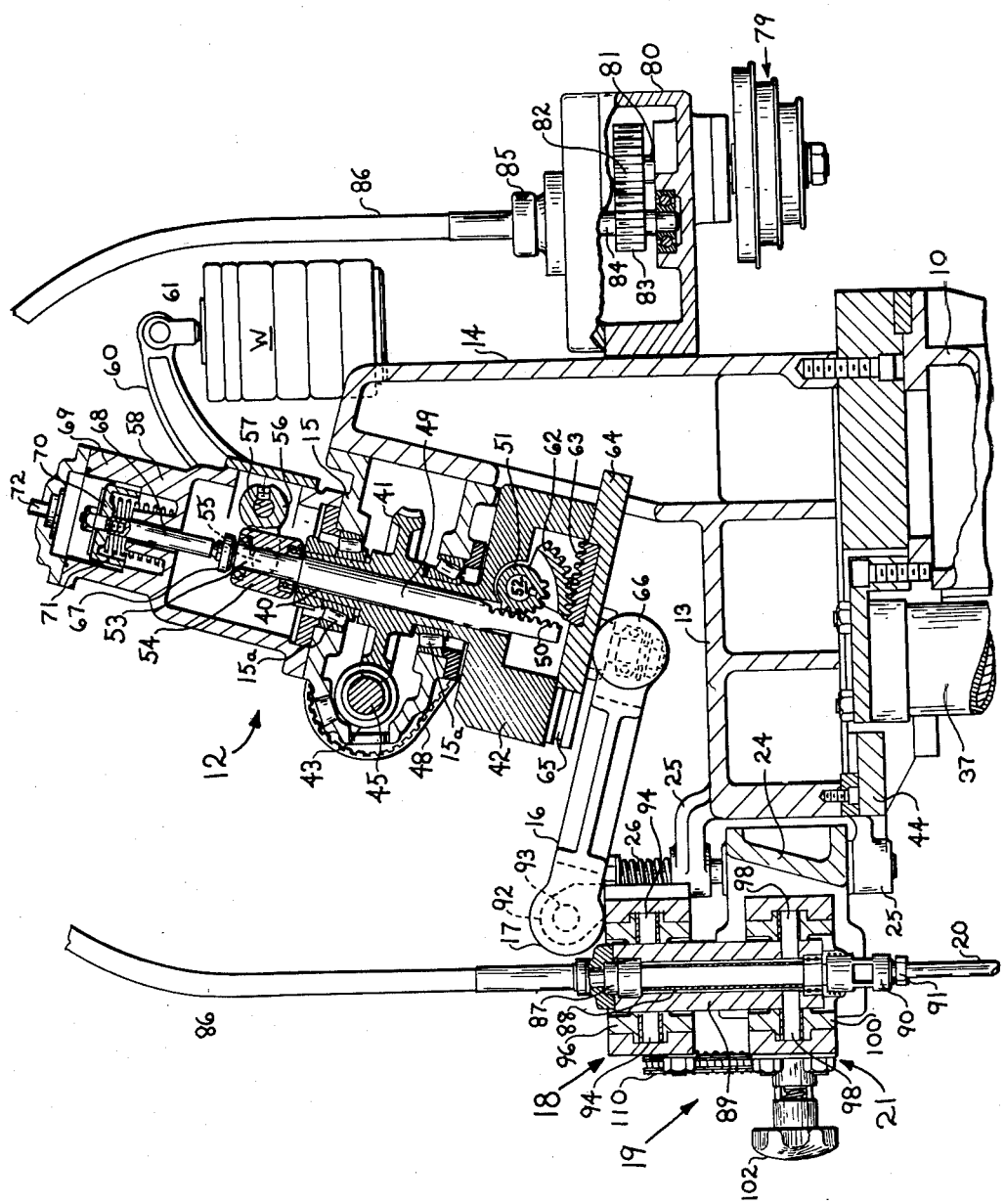
Figure 4:
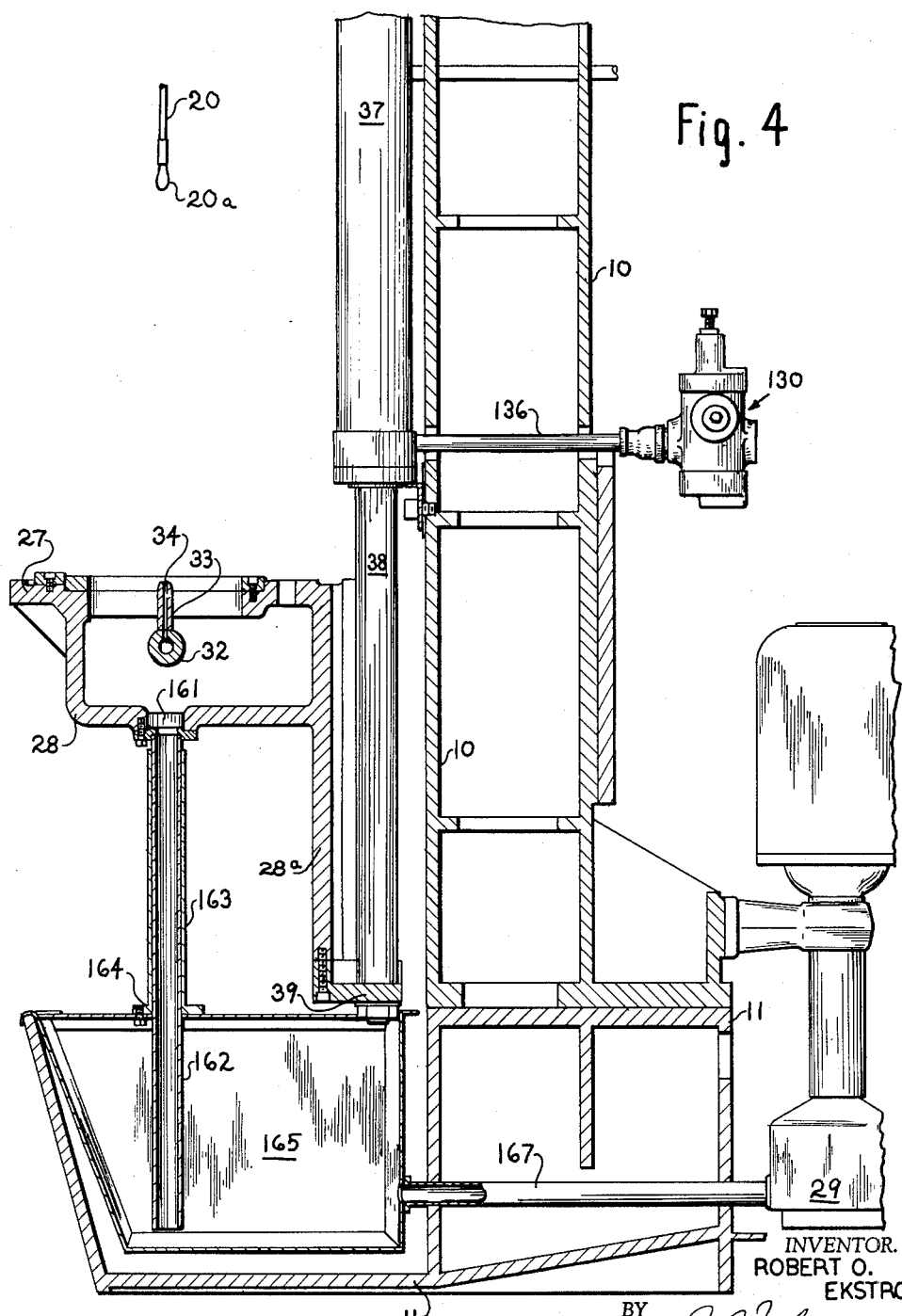
Figure 5:
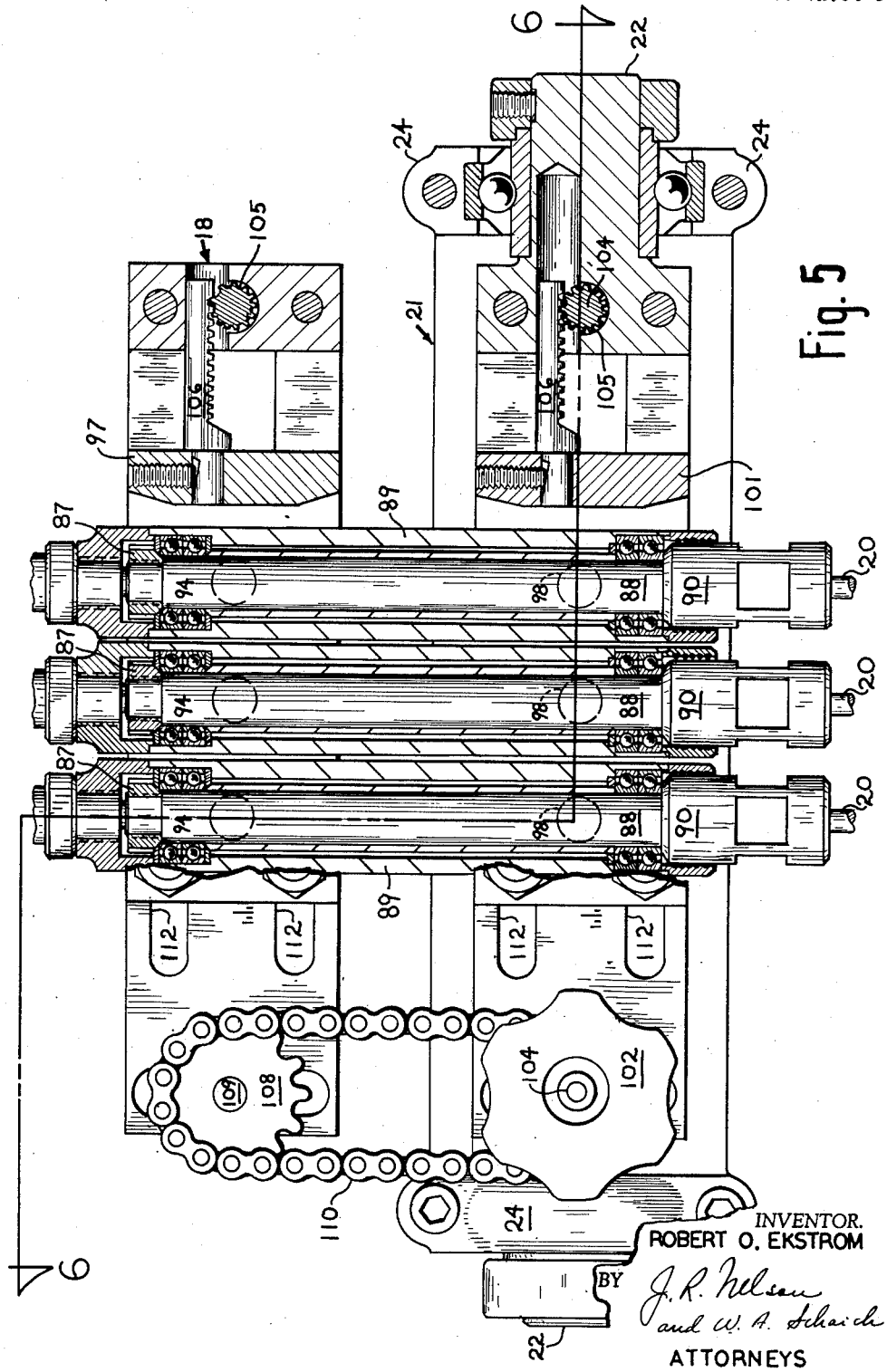
Figure 6:
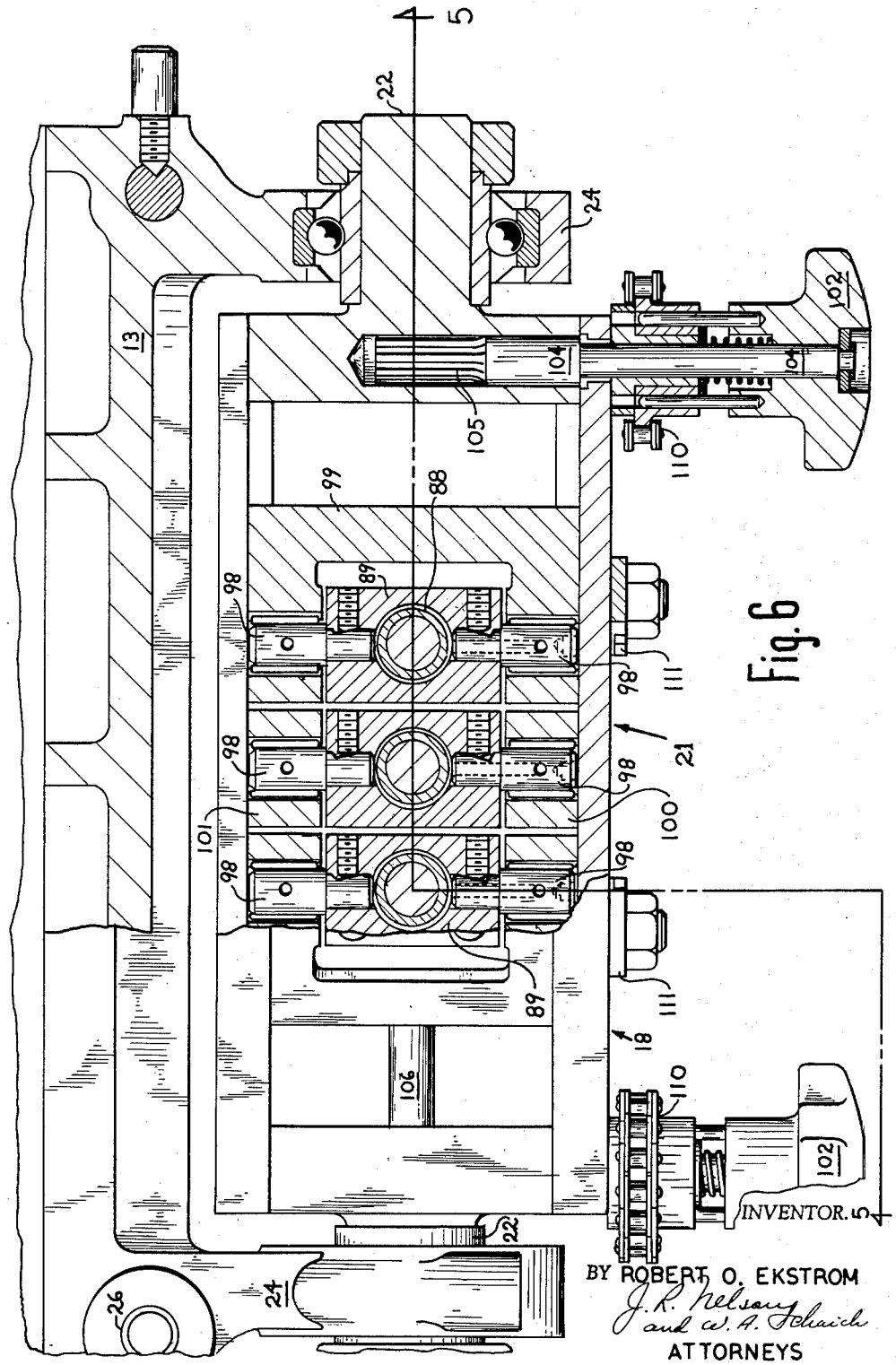
Figure 7:
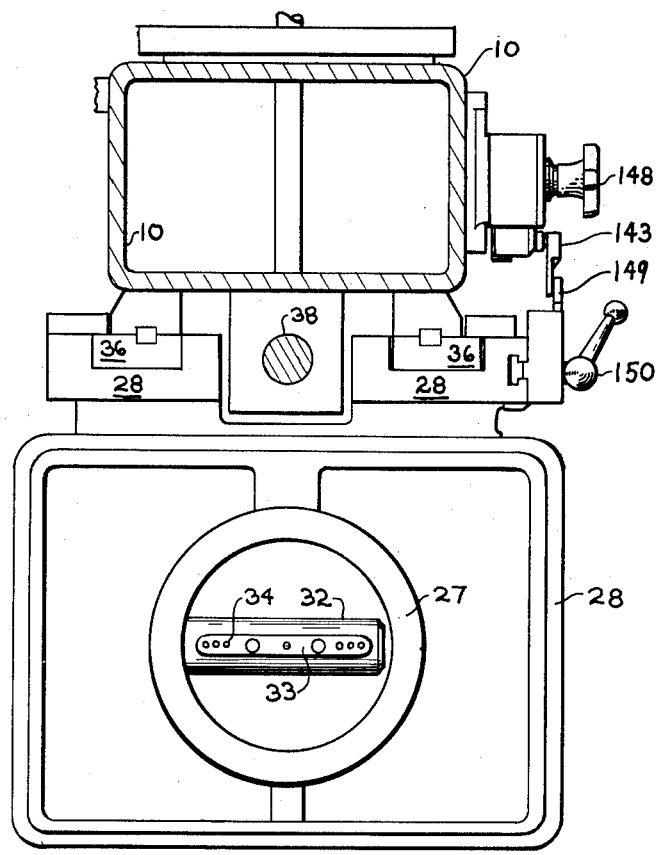
Figure 12:
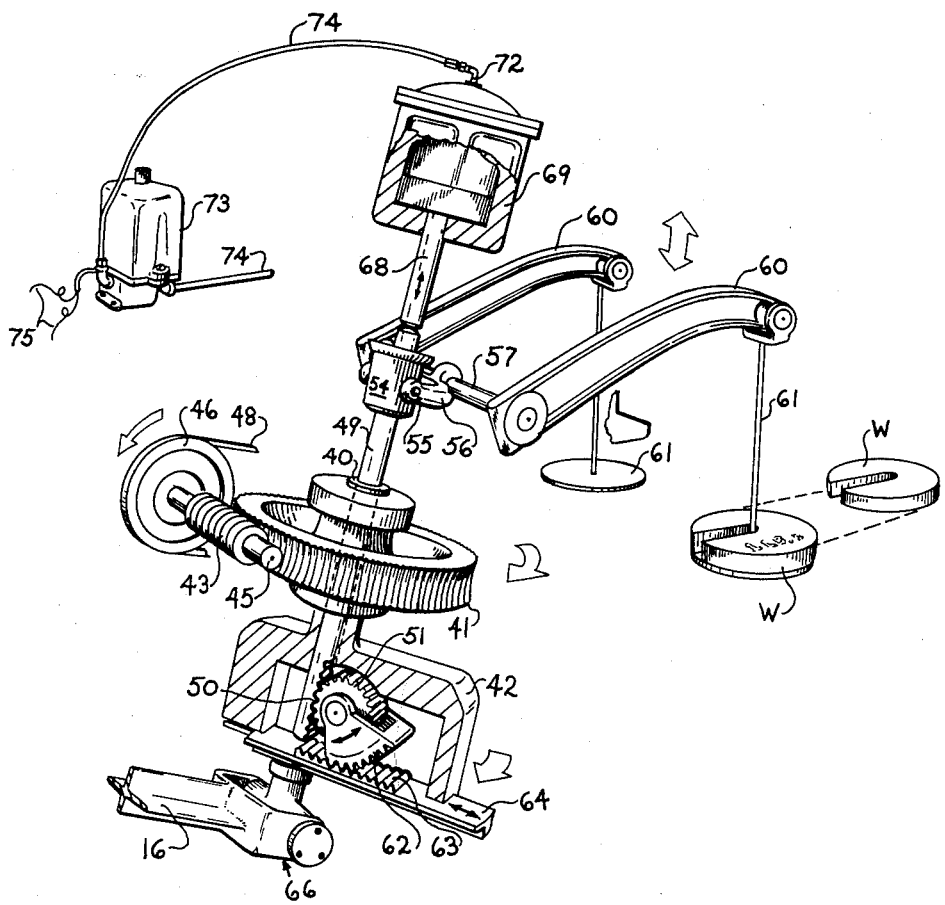
Figure 13:
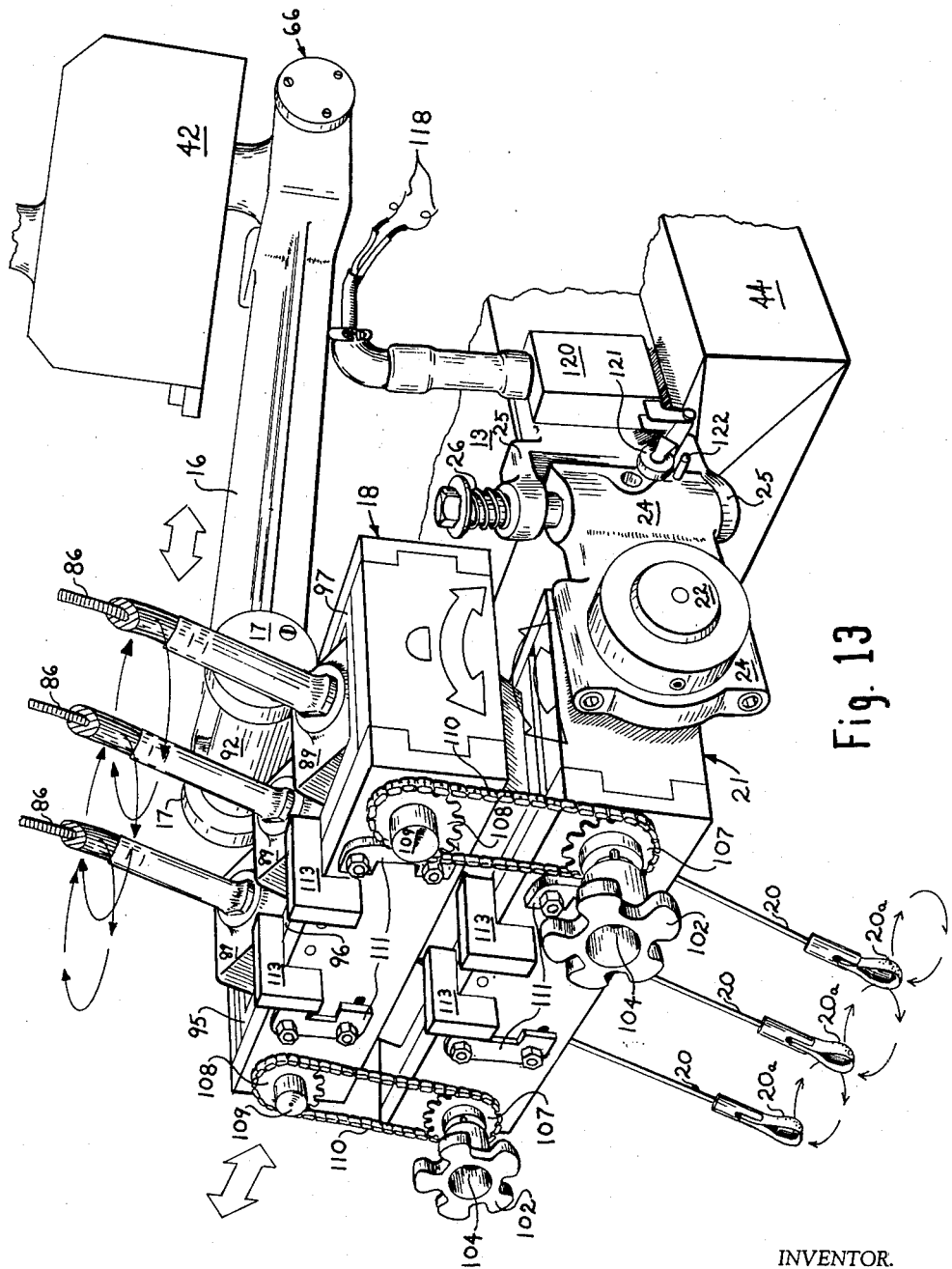
Figure 14:
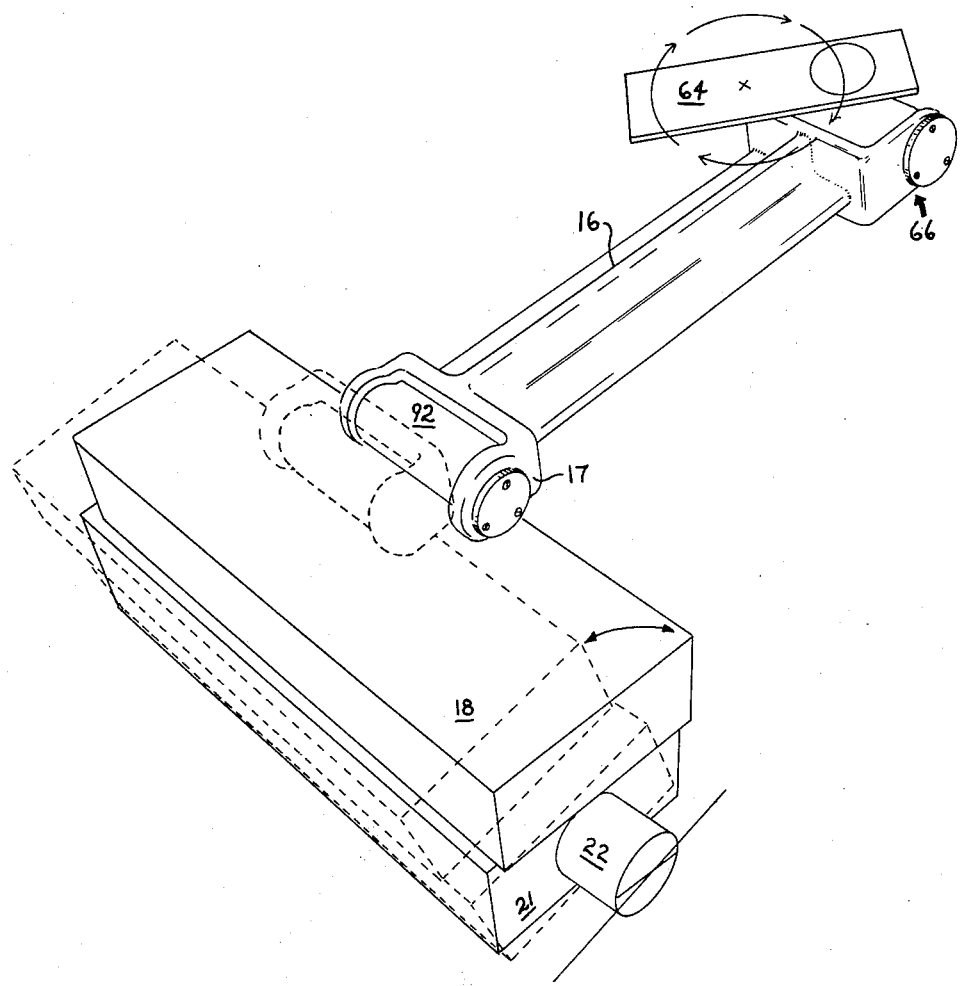
Figure 15:
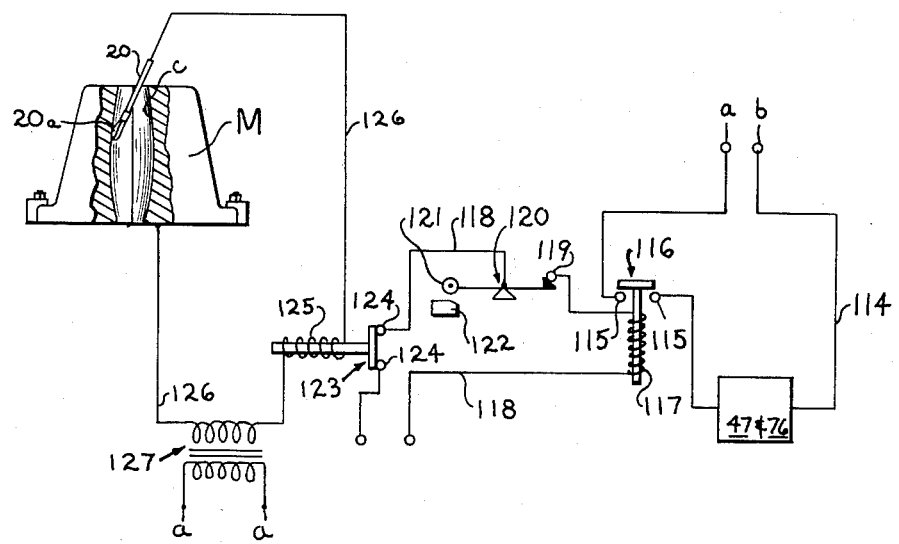
Figure 16:
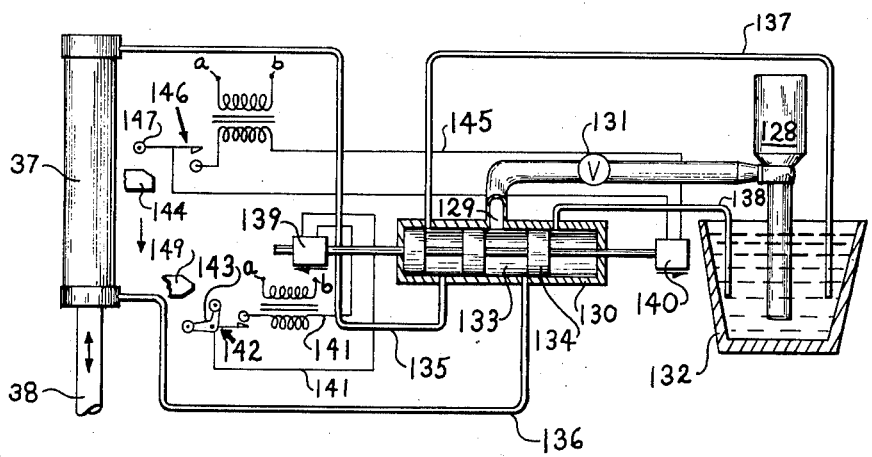

In the drawings:
FIG. 1 is a side elevational view of the mold polishing machine of the present invention with parts cut away and sectioned;
FIG. 2 is a top view of the machine;
FIG. 3 is a partial sectional elevational view taken along lines 3—3 on FIG. 2;
FIG. 4 is a partial sectional elevational view of the lower portion of the machine as taken along line 3—3 on FIG.2;
FIG. 5 is a front elevational view, partly in section, of the gimbal drive mechanism for the mold polishing heads of the machine. This view is taken along the line 5—5 on FIG. 6;
FIG. 6 is a plan view, partly in section, taken along line 6—6 on FIG. 5;
FIG. 7 is a plan sectional view taken along line 7—7 on FIG. 1, the mold workpiece being removed;
FIG. 8 is an exploded perspective view showing the mold polishing spindle and mold polishing head assembly of the invention;
FIG. 9 is a detailed end view, in perspective, showing the abrasive tip assembly of the mold polishing spindle of FIG. 8;
FIG. 10 is a perspective view of a mold polishing wheel of the invention;
FIG. 11 is a perspective view of another form of mold polishing element useable on the machine of the invention;
FIG. 12 is a perspective schematic view of the drive assembly for the mold polishing implement of the invention, said assembly being shown in sectional elevational view on FIG. 3;
FIG. 13 is a perspective view of the gimbal drive mounting for the mold polishing spindles of the machine, as is shown in section views on FIGS. 5 and 6;
FIG. 14 is a perspective schematic view showing the variable slide crank drive mechanism and gimbal mounting for the spindles of the machine, as may be seen on FIG. 13;
FIG. 15 is a schematic wiring diagram showing a safety control feature of the invention;
FIG. 16 is a schematic piping and wiring diagram for the controls on the machine for reciprocally moving the workpiece in its polishing cycle.

The invention centers about an automatic machine for polishing mold cavities singly or simultaneously polishing a plurality of cavities of the same mold. The machine, as is shown on the drawings, is intended for use in polishing the cavities of molds, such as those employed in the manufacture of glassware. The machine generally comprises a vertical frame to which are attached a mold supporting table and a polishing spindle guide unit or carrier. The work table is positioned below the spindle guide carrier and may be reciprocated up and down towards and away from the ends of the polishing spindles. The spindle guide comprises two horizontal, rectangular racks, one positioned above the other. The lower rack is mounted on the frame so as to be pivotal about a longitudinal or horizontal axis. Each of the spindles is joined to the lower frame in a manner which will tolerate pivoting them along an axis transverse to the axis on which the rack itself is adapted to be pivoted. The upper rack is joined only to the spindle heads and to an arm which is connected with the spindle drive mechanism, to be hereinafter described. The foregoing upper and lower racks comprise a gimbal mounting for the spindles which will permit the spindles to achieve orbital or universal movement as provided by the drive crank of the spindle drive mechanism.

The spindle drive mechanism constitutes an important feature of the invention and is adapted to impart the orbital motion to the polishing heads carried by the spindles. The arm which links the spindle heads to the drive mechanism is attached by a universal joint to a rotatable, shiftable plate that serves as a variable crank means, which itself is caused to move according to a desired orbital pattern. Circular movement is imparted to the plate by rotation of a shaft that is attached normal to the surface of the plate. Rectilinear, oscillatory movement is transmitted to the plate by a rack and pinion arrangement, the rack being incorporated into the same rotatable shaft which is employed to rotate the plate. Conventional belt and worm gear drive is employed to rotate the shaft assembly. A combination mechanical lever arm carrying weights so as to apply a gravity force and a fluid power source are employed to reciprocate the rack. The mechanical arm is connected and weighed during polishing operation so as to apply a uniform force to the rack through the lever arm, and thereby establish a uniform polishing force on the polishing spindles. The fluid power source is operated at the end of a polishing operation so as to bias the lever arm and operate the rack in reverse. This will center the drive connection of the shiftable plate on the center of its shaft so that the orbital pattern of the spindles is terminated and the spindles are centered with respect to the cavity of the workpiece.

The rack meshes with a fragmentary gear which serves to translate the generally vertical reciprocatory motion of the rack into horizontal reciprocatory motion of the shiftable plate through engagement with a segmented, rectilinear geared face on the surface of the plate. This latter gearing arrangement is much the same as a rack and pinion connection. The individual polishing tools have independent rotary motion which is provided by a flexible drive cable rotatably connected to a separate power source. The orbital loading of the polishing tools on the ends of the spindles against the mold surface may be adjusted by the magnitude of the weights on the mechanical lever arm portion of the mechanism. This force applying means is connected to operate mechanically and by gravity in adjusting the rack of the mechanical drive connection and thereby varying the drive radius of the shiftable plate member. The mechanical arm bearing the weight is rotatable or tiltable in response to the shifting of the shiftable plate and the application of varying amounts of weight.

In practice, the mold is situated on the mold support table so that its cavity, or where the mold presents plural cavities, each of its cavities, is positioned in registry below the end of a corresponding spindle. The mold support table is raised to permit the polishing heads on the spindles to enter the cavities, whereupon the spindle drive mechanism is set into orbital movement through release of the hydraulic force and placed under the control of the mechanical weighted force. By virtue of the orbital movement established through the latter procedure, loading of the polishing spindle heads causes the polishing elements thereon to contact the wall at the periphery of each cavity of the mold with a constant, even pressure. By virtue of further vertical reciprocation of the mold support table, all parts of the mold cavity are brought into contact uniformly with the polishing tool. Throughout the operation, fluid coolant is sprayed upwardly through the work table and into the lower end opening of the mold cavities. When polishing is completed, the drive mechanism is stopped and the spindles simultaneously centered at a rest position, whereupon the mold support table is lowered away from the spindle so that the molds may be removed and replaced by the next workpiece.

Controls are provided, as herein disclosed, which permit a cyclical reciprocation of the mold with respect to the orbiting polishing spindles; and a further control feature, as a safety device, is included, whereupon, should the metallic spindle engage the metallic mold undergoing polishing, one or more of the machine drive motors is stopped automatically to prevent injury to either the workpiece or the polishing elements.

Referring now to FIG. 1 of the drawings, the machine is seen to comprise a vertical frame 10 which is connected for support on a lower base 11. The upper end of the frame 10 supports the spindle drive mechanism indicated generally at 12, by the upper casting 13. This upper casting has a vertical bracket 14 which, through a yoked portion 15 supports the spindle drive mechanism 12. Intermediate the upper casting 13 and the vertical frame 10 is a Micarta insulating block 44 which electrically insulates the upper assembly of the machine from its lower extremities.

The spindle drive mechanism includes a crank arm 16 which has a pivotal bracket and pin connection at 17 to the upper rack 18 of the spindle guide means, indicated generally at 19, for the polishing spindles 20. The polishing spindles 20 are rotatably housed in the upper rack and likewise extend rotatably through the lower rack 21, the latter having a lateral trunnion shaft 22 which has end bearing mountings 23 supported by the bracket 24 which is yieldingly, vertically mounted at the edge of the casting 13 on the post-like members 25. This vertically shiftable mounting for the member 24 is yieldable under spring tension provided by springs 26. Thus, should the mold polishing spindles 20 meet with interference from an underlying object, the mounting for the spindle guide means is yieldable vertically so as to reduce any hazard of injury to the mechanism.

At the lower extremities of the machine, a mold support table 27 is mounted in vertical ways 36 for movement along the vertical frame 10. The mold support table has an outer housing 28 which extends downwardly to a drain into the hollow base 11 which serves as a sump. Mold polishing or coolant fluid is circulated from the lower sump by a pump 29 through piping system 30 which extends to a flexible joint 31 at the side of the housing 28. From this joint 31 a lateral pipe 32 extends inside the housing 28 and underlies the mold support table 27, as seen on FIGS. 4 and 7. This lateral pipe 32 then extends upwardly into elongated jet spray elements 33 which have spaced nozzles 34. The nozzles are arranged to communicate with the cavities C of the mold that is undergoing polishing. The nozzles and their arrangement are best seen on FIG. 7.

Thus, the machine is equipped to mount a mold M by the clamps 35 on the mold table and securely fasten the mold in a position for manipulating it in polishing. The mold table has a drive connection at 39 to a vertical hydraulic cylinder 37 (FIG. 4). The motor cylinder 37 has a downwardly extending piston rod 38 that is connected to a bracket 39 on the column of mold table housing 28. The motor 37 receives its power through a hydraulic fluid supply system under control of a reversing valve, as will be hereinafter described.

Thus, in operation the mold M is reciprocated vertically until the polishing element 20a of the spindles 20 is centered and inserted into the mold cavity C. At this time, the drive for the polishing spindles is brought into operation, as will now be described.

Referring now to FIGS. 3 and 12, the bracket frame 15 has tapered roller bearings 16 which rotatably house the vertical shaft assembly 40. The shaft assembly 40 is a tubular member to which is rigidly secured a worm gear 41 and a lower rotatable casting 42. Gear 41 forms a pinion which is in meshing engagement with the worm 43 secured on the drive shaft 45. Shaft 45 is bearing mounted in the housing of bracket casting 15 and carries a drive pulley 46 on its outer end. The drive pulley 46 is connected to the drive motor 47 by the belt 48 (FIG. 2). The motor 47 is mounted on the upper casting 13 of the machine. Coaxially with the tubular drive shaft assembly 40 is a central shaft 49 which is an axially shiftable element that is housed therein for axial movement. The lower end of the shaft 49 is provided with rack gear teeth 50 which are in mesh with a pinion segment 51 on a lateral shaft 52 that is rotatably mounted in the lower casting 42 of the hollow drive shaft assembly 40. The upper part of shaft 49 has a reduced diameter section 53 which has a bearing block or collar 54 secured thereon. The collar has side lugs 55 which receive the ears of a yoke assembly 56. The yoke assembly 56 is rotatably mounted in journals 59 and is rotatable on the upper motor housing 58 which is integral with the bracket casting 15 (FIG. 2). A pair of lateral arms 60 are clamped on the opposite outer ends of the shaft 57. The arms 60 normally extend at an upwardly inclined, oblique angle (about 40–60° measured from vertical). The arms 60 have hangers 61 rotatably connected at the outer end of the arms and receive slotted weights W.

The combinations between the yoke 56, its pivot at 57, and the arms 60 comprise a bell crank mechanism for transmitting rotary motion about shaft 57 onto the bearing block 54. The bearing block 54 in turn transmits a rectilinear axial shifting movement of the shaft 40 through its upper end portion 53.

These weights exert a downward force on the outer end of arm 60 which transmits a torque on shaft 57 and in turn through the yoke member 56 exerts an axial shifting force on the shiftable central shaft 49 through the bearing block 54, 55. As the shaft 49 is urged upwardly, the rack gear teeth 50 transmit rotary motion to the pinion segment 51. Keyed on the same shaft 52 with pinion segment 51 is a gear segment 62. This gear segment 62 is coaxially mounted and connected with the pinion 51 and its teeth are in mesh with the rack gear teeth 63 on the slidable crank member 64. The crank member 64 is carried by a tongue and groove connection on the casting 42 comprised of ways 65 on the lower side of the spindle drive assembly 42. A universal joint 66 is connected on the underside of the crank member 64. This universal joint connects the one end of the arm 16 to the variable crank member 64.

At the opposite end of the shaft 40 is a bearing nut 67 which is in contact with the end of the piston rods 68 of a fluid pressure operated motor 69. The motor 69 is integral with the upper motor housing 58 on the bracket 15. The piston of the motor piston 70 of the motor 69 is spring loaded by spring 71 normally urging the piston rod and piston upwardly and yieldably with any motion transmitted to the bell crank connection 56, 57, 60 of the weights W. The motor is actuated in the opposite direction by pressure fluid introduced through port 72. As desired, a valve may be manipulated in the pressure line to port 72 to introduce fluid pressure into the cylinder of motor 69 and thus shift the piston 70 downwardly and compress the spring 71. This will also transmit a downward axial movement to the shaft 40 until the universal joint connection 66 is centered on the axis of the shaft assembly 40, 49. With the universal joint 66 centered on the axis of the drive shaft assembly, the crank arm 16 will be connected concentrically with the tubular drive shaft. Thus, the crank arm 16 will receive no orbital movement.

At such time as it is desired to begin the orbital polishing movement of the spindles 20, the pressure fluid is released at port 72 and exhausted therethrough such that the bell crank mechanism 55, 56, 60 transmits the torque movement to the central shaft 49 and thereby, through the gearing 50, 51, 62 and 63, the crank member 64 is shifted so that the universal joint 66 is eccentric with respect to the center line of the drive assembly 40. This will provide a crank radius on the crank member in its connection to the universal joint 66. By so doing, the crank arm 16 will transcribe a variable orbital movement to the spindle carriage 19. Thus, in operation, the mold M is placed on the mold table 27 such that its cavities C extend vertically in an upright position beneath the spindles 20. At this time, the manual control switch (not shown) in circuit with the lead 75 is operated to open the solenoid-operated valve 73 and introduce air pressure to line 74, port 72 and the cylinder of motor 69. This depresses the piston 70 and shifts the central shaft 49 so as to center the universal joint 66. In so doing, the spindles 20 are centered with respect to the axis of the mold cavities C. The motor drive for the mold support table 27 is then put into operation by a control means, to be hereinafter described, so that the mold is raised towards the spindles 20 until the polishing elements 20a on the end of the spindles are within the confines of the mold cavities C. At this point, the solenoid-operated valve 73 is closed and the spring 71 in the motor 69 reverses the piston 70 so as to remove the force on the central shaft 49. As this takes place, the weights W on the crank arm 60 exert their torque through the bell crank mechanism, above described, and the side lugs 55 on the bearing block 54 rectilinearly actuate the central shaft 49 and increase the crank radius at the crank member 64 moving the universal joint connection 66 off center. As the tubular drive shaft assembly 40 thereafter rotates under its drive connection with the motor 47, an orbital motion is transmitted to the crank arm 16. This will transmit, through the spindle carriage 19, an orbital motion to the spindles 20 as their polishing elements 20a are brought outwardly into peripheral contact with the mold cavity wall. The motor 76 is meanwhile operating to transmit rotary drive motion through the flexible spindle shafts 86 and rotate the spindles. These spindle shafts 86 are connected to the spindles 20 at a drive coupling 87 that is securely attached on the shafts 88 rotatably mounted in spindle carrier elements in the form of the spindle bushings 89. At the lower end of each of the hollow shafts 88 is a coupling adapter 90 onto which the spindles 20 are detachably coupled by the fittings 91.

Referring now to FIGS. 3, 5, 6, 13 and 14, the spindle carriage means is shown for mounting the spindle for a rotation about its own axis and an orbital rotation about a central neutral axis. The means comprises first and second racks shown as an upper rack 18 which is pivotally connected by a center pin 93 through a journal 92 and a yoked bracket 17 on the end of crank arm 16. This connects the upper rack 18 wtih the variable radius crank and pitman linkage 16, 66, 64. The polishing heads are connected to the upper rack 18 by upper stub shafts 94 on bushing blocks 89 that are trunnion mounted in journals in individual internal slide blocks 95—97. These slide blocks are fitted in parallel grooves that extend longitudinally of the upper rack 18 and permit lengthwise adjustment of the spacing between the spindles by mechanism to be later described. Thus, as may be seen on FIG. 13, the bushing blocks 89 are rockable in a vertical plane along the upper rack 18. The bushing blocks 89 are also similarly pivoted in lower slide blocks 99—101 similarly held by parallel grooves in the lower rack 21. These pivotal mountings are by lower stub shafts 98 on the bushing blocks and are trunnion mounted in journals of the slide blocks 99—101. These lower stub shafts 98 provide a pivot for rocking the bushing blocks 89 in a vertical plane thereabout so that the upper rack 18 shifts substantially parallel in a lateral direction with respect to the lower rack 21. The lower rack 21 will pivot or rock in its trunnion mounting of the shaft 22 held in the bearings of the trunnion carriage brackets 24. As shown on FIG. 13, this provides a mounting for universal orbital movement indicated by the arrows. This mechanism duplicates the motion described by the universal joint 66 and transmits the same as an orbital rotation to the polishing elements 20a on the ends of the spindles. This orbital movement is shown in the perspective diagrammatic drawing of the two racks on FIG. 14.

The upper and lower racks 18 and 21 are provided with an adjusting mechanism for varying the axial spacing between the spindles 20 in accordance with a variation between the central axes of the cavities on the mold. This provides for flexibility in the use of the machine for polishing or treating a variety of molds or workpieces which may have one or a plurality of cavities. In polishing a single cavity mold, for example, the right and left-hand spindles respectively (as seen on FIG. 5), may be removed at the coupling adapter 90. Then only the single center spindle depends from the spindle carriage. This will enable polishing a mold with a single central cavity. If the mold has a single cavity that may be off-set, the two right-hand spindles may be removed at their adapters 90 and the single dependent left-hand spindle 20, for example, may be adjusted to register with the cavity. This adjustment may be made by use of the mechanism to be described hereinafter.

Both the upper and lower sets of slide blocks 95—97 and 99—101 are slidably adjustable, as mentioned. This is achieved through the adjusting knobs 102 which are keyed on shafts 104. The shafts 104 extend through the outer member of the lower rack 21 and are rotatable therein. A space is provided internally of the rack for gear teeth segments such as 105. The gear segments 105 are in mesh with rack gear teeth on a member 106 attached to one of the outer lower slide blocks, such as 101. The two lower shafts 104 each have a gear 107. The upper rack 18 is similarly constructed with a gear 108 keyed on shafts 109 that extend into the upper rack 18. Shafts 109 likewise have gear teeth that mesh wtih rack gear teeth on the members 106 rigidly attached to one of the outside slide blocks, such as 99 or 101. The two gears 107 and 108 are connected together for similar and simultaneous rotation by a chain 110. Each of the slide blocks 99—101 in the lower rack 21 and 95—97 in the upper rack 18 are locked in a desired setting for their spindles by U-clamps 111 which are bolted through slots 112 in the front side of the upper or lower racks 18 and 21. These U-clamps are secured after the desired proper spacing between the spindles is achieved. U-shaped spacers 113 may be inserted between slide blocks 99 and 100, 95 and 96 and between slide blocks 100 and 101, 96 and 97, as shown on FIG. 13, as a gauge for setting this spacing. With the spacers 113 in place and the bolts on the U-clamps 111 tightened, the carriage for the spindles is set to the desired centered distance for carrying on a given polishing operation on a mold. As the center distance condition changes on another job, the center distance may be varied by loosening the U-clamps 111 and adjusting both knobs 102 in the appropriate direction of rotation to either widen or close the spacing between the two outermost spindles with respect to the central one.

Referring now to FIG. 15, a safety device is provided on the machine which comprises the motor circuit 114 for energizing the motors 47 and 76 from A.C. current supply a, b. The circuit 114 includes a pair of contacts 115 of the relay 116. Relay 116 is normally open and is closed by current flowing in its coil 117. Relay 116 is preferably a low voltage relay, such as a twenty-four volt relay, that is operable to close the motor circuit for running the machine drive motors. The motor circuit also includes the usual stop-start switch mechanisms, etc. (not shown). Relay coil 117 is in the circuit 118 which is connected across terminals c and d of the low voltage supply and extends to the contacts 119 of a normally closed limit switch 120. Limit switch 120 includes a roller actuator 121 which is carried in alignment with a lug or pin 122 on one of the trunnion bracket members 24. The switch 120 is mounted stationary on the frame casting 13. Since the spindle carriage 19 is yieldably mounted against spring 26 for vertical movement, any interference between the spindle 20, 20a and the workpiece causing the spindle carriage to lift on its mounting posts will cause lug or pin 122 to engage the limit switch roller 121 and open the circuit 118 at the contacts 119. The parts just-described are best shown on FIGS. 1, 2 and 13, as well as on the schematic FIG. 15. Opening the limit switch in circuit 118 breaks the circuit of coil 117 causing the relay 116 to open and stop motors 47 and 76. Also included in the circuit 118 is a normally closed relay 123 closing its contacts 124. The relay is opened by energizing its coil 125 in the circuit 126 connected with the secondary side of a transformer 127. Power is furnished to this circuit by transformer 127 connected across main line terminals a, b to provide a low voltage source. One side of the circuit 126 is connected to a metallic, electrically conducting portion of the spindle 20. The other side of the circuit 126 is connected to the metal mold or workpiece M. The tip or polishing element 20a of the spindles is insulated from the spindle stems 20 by either a rubber pad or a non-conducting abrasive element, such as shown and described in FIGS. 8–11.

Thus, in the process of polishing cavity C should the spindle 20 make metallic contact with the mold M, the circuit 126 will be completed through the metal of the parts 20 and M. This will close the circuit through the coil 125 of the normally closed relay 123 and open that relay thus breaking the pair of contacts 124. These contacts in the circuit 118 will thus break that circuit and de-energize the coil 117 of the motor circuit relay 116. Thus, when this relay opens, the motors 47 and 76 will be automatically stopped. This will prevent any damage arising from the spindles 20 coming into contact with the end or other part of the cavity C of the mold M.

Referring now to FIG. 16, the cycling control for the motor 37 will now be described. As was mentioned, the motor 37 has its piston rod 38 operatively connected to drive the mold support table 27 up and down along its guide ways in the frame 10. Motor 37 is connected to a source of operating fluid under pressure, such as supplied by the pump 128. The pump is in turn connected to the inlet port 129 of the solenoid-operated reversing valve 130. The pump line connection 129 includes a throttle valve or pressure regulator 131 to regulate motor speed. The pump 128 draws its material, such as a hydraulic fluid, from the sump 132 and supplies same into the chamber 133 of the valve 130. The valve has the usual valve stem 134 which is shiftable to alternatively connect line 129 with either of the outlet lines 135, 136. These lines 135, 136 connect to the opposite ends of the cylinder of the motor 137. At the same time the valve stem 134 will alternatively connect the lines 135, 136 with the two exhaust outlets from the valve which are numbered 137 and 138. As mentioned, the valve 130 has its valve stem operated by solenoids 139 and 140 connected at opposite ends of the shaft of the valve stem 134. The left-hand solenoid 139 is connected in a circuit 141 with a limit switch 142. This toggle switch is operated by a roller link 143 which is contacted by a lug 149 carried on the housing 28 for the mold support table. The other solenoid 140 is in a circuit 145 with the limit switch 146. This limit switch has an actuator roller 147 mounted on frame 10 and engageable by the lug 144, which is also carried by the housing 28 of the mold support table.

Referring to FIGS. 1 and 7, the upper roller 147 of the limit switch 146 is adjustable vertically on the frame 10 by the hand nut 148. Thus, as shown on FIG. 16, the machine is started with the valve spool 134 set to supply fluid to the lower end of the motor 137 and raise the mold table. As may be seen on FIG. 1, the lower lug 149 will first engage and trip the lower limit switch by engagement of the top side roller on the link 143. This will merely set the circuit ready for the other roller on the link 143 to be engaged by the lower lug 149 on the reverse downward travel of the mold table. As the mold table continues to rise vertically, the upper lug 144 will engage the roller 147 and trip the limit switch 146 to close the circuit 145. The position of the switch 146 will define the upper limit of movement of the mold table. Closing circuit 145 will energize the right-hand solenoid 140 and shift the valve spool 134 to the right. Pressure fluid will then be supplied into the line 135 and reverse the piston of motor 137 to move in the downward direction. As the mold table 27 moves downwardly, the lower lug 149 will engage the roller on the link 143 and operate the switch 142, thus closing the circuit 141 to the left-hand solenoid 139. This will again reverse the valve 130 and likewise reverse the motor 37. The mold support table is thereby cycled or reciprocated between set upper and lower limits for completely moving the mold polishing elements 28 reciprocally of the cavity C during which time the drive mechanism for the spindles is in operation and the spindles 20, 20a are driven orbitally under the control of the mechanism described earlier herein. The reciprocation of the motor 37 may be controlled through the location of the limit switches 142 and 146. As previously described, the switch 146 is located by the adjustable knob 148. The lower limit switch 142 is adjustable through the knob 150 and the lower lug member 149, which co-operate with the switch 142 is adjustable on the mold column 28 at 151.

Although a fully hydraulic system is shown and described on FIG. 16, it is just as practical to use a compressed air system wherein the valve 130 will be connected to furnish air pressure for lifting the table 27 and upon the reverse setting of the valve 130, the air will be regularly exhausted so that the table lowers by its own weight.

In connection with the safety controls described under FIG. 15, the circuits there shown may include a relay in the circuit for one of the solenoids of the reversing valve 130 for the motor 37. Thusly, all three motor drive means of the machine are placed under the described safety control and upon occurrence of either type physical interference between the polishing elements or spindles and the mold, all three motor drive means of the machine are automatically stopped. Further, as an alternative, it would be practical to energize the solenoid 140 automatically for assuring downward movement of the mold table 27 immediately upon any physical interference just-mentioned.

Furthermore, suitable automatic controls, such as a timer, etc., may be included in the circuits 141, 145 to the solenoids for cycling the motor 37 any desired number of cycles in polishing the molds and then automatically lowering the mold table to a remote position and at the same time stopping the other two motor drive means 47, 76. Various types of timed cycling controls for doing this are commercially available, and for sake of simplicity of illustration, examples thereof are not shown on the drawings. Other desired features in motor control of motor 37 may be included, such as an overriding rapid traverse system for manually raising and lowering the mold support table in setting up a polishing job on the machine, etc.

Referring to FIGS. 8 and 9, another feature of the invention is shown. FIG. 8 is an exploded view of the parts which make up a novel polishing spindle assembly of the machine. The spindle 20 includes at one of its ends a threaded stem connection 91 for attaching it to the adapter 90 in the spindle carriage assembly 19 (FIG. 3). The other end of the spindle has an internally threaded sleeve 152 which has a radially dished out surface 153 to receive the one end of clip member 154. The clip has opposed, peripheral, axially extending slots. Clip 154 receives a stem member 155 which has an intermediate boss tapered at 156 to an enlargement that exceeds the internal diameter of clip 154. The plug 155 has a threaded end stem 157 for securing it onto sleeve 152 and an opposite cylindrical end 158. The cylindrical portion 158 receives an insulated, rubber polishing pad 159 over which a strip of abrasive, such as emery cloth, is secured. As shown in assembled relationship on FIG. 9, the abrasive strip 160 is laid over the pad 159 and the ends inserted between the slots of the clip 154 and the taper 156 on the member 155. The threaded stem 157 is then drawn into the sleeve end 152 of the spindle 20 until the enlargement portion 155 clamps the strip of abrasive 160 securely into the clip. The polishing member, indicated generally as 20a, is then ready for use. The strip 160 may be easily changed by reversing uncoupling and then recoupling the member 155 onto the end of the spindle. The rubber pad 159 and abrasive strip 160 electrically insulates the polishing spindle 20 from the mold metal M in normal polishing operation.

As an alternative form of polishing member, an abrasive wheel shaped as a rotary stone 20a' may be used on the spindles 120. One relatively thin form of generally cylindrically shaped stone is shown on FIG. 10. The stone 20a' is formed on a hub which has a threaded stem 157' that functions much the same as part 157 (FIGS. 8 and 9) in securing the polishing element 20a' onto the spindle end 152. The stone 20a' electrically insulates the spindle 20 from the mold metal.

FIG. 11 shows still another form of polishing element 20a'' which comprises a more elongated, cylindrical polishing wheel. It is similarly formed on a hub that has a threaded stem 157'' for attaching it to the spindle end 152, and provides electrical insulation of spindle 20 from the mold metal.

The spindle shafts 20 are preferably constructed of a spring steel so that they have some deflection in polishing. In the event the cavity centers of a plural cavity mold job are different as between different molds of the one type being polished, the defectable, spring steel shafts of the spindles 20 will provide, to a minor degree, a means of self-alignment.

The molds as they are polished are cooled and lubricated by a cutting fluid, such as a soluble cutting oil and water mixture. Referring to FIGS. 1, 4 and 7, the fluid is supplied to the pipe 32 and issued into the mold cavities C by the upturned nozzles 34. The pressure of the pump 29 is regulated so the cutting fluid may scan the length of the cavities, but preferably will not squirt out of the upper end openings of the molds (for example, see outline for the spray on FIG. 1). The spent fluid is then collected in the bowl portion of the housing 28 and drained through the outlet 161 and the attached, vertically suspended pipe 162. Pipe 162 fits telescopically in a vertical standpipe 163, which serves as a telescopic guide. The pipe 163 has a connection 164 to the tank 165. The tank is nestingly supported in the base casting 11 of the machine. A handle 166 (FIG. 1) is provided for manual removal. The pump 29 has a pipe connection 167 extending from the tank 165 for recirculation and reuse of the cutting fluid.

While embodiments of the present invention have been herein specifically suggested and described, other embodiments and variations may occur to those skilled in the art after a knowledge of the disclosure herein, and it is desired to include within the scope of the patent granted hereon all such embodiments and variations, and more particularly as comprehended by the appended claims.

I claim:
1. Apparatus for polishing a cavity defining wall of a workpiece comprising a support means for the workpiece, a polishing head including a spindle carriage, a rotary spindle and a polishing member thereon adapted for insertion into said cavity, spindle guide means supporting the polishing head for axial and orbital rotation of the spindle, the spindle describing a variable orbital path, drive means connected to the spindle for imparting there- to said axial rotation, a separate drive means for imparting to the spindle a variable orbital rotation comprising a shaft, a variable crank means connected to said spindle carriage and mounted for rotation about the axis of said shaft, a motor, a drive connection from the motor to said shaft for rotating the later, and a means connected to said crank means for varying its crank radius thereby varying the orbital rotation of said spindle in accordance with the peripheral contour of said cavity of the workpiece while maintaining polishing contact of the polishing member on the cavity defining wall of said workpiece, and means for relatively moving the workpiece and polishing member axially of the cavity.

2. Apparatus for polishing the wall defining an open-ended cavity of a workpiece of the class described, comprising a spindle and rotary polishing element thereon, spindle carriage means mounting the spindle for rotation about its own axis and orbital rotation about a central neutral axis, means for supporting the workpiece with its cavity axially disposed along said central axis and the end opening thereof in axial registry with said polishing element for receiving the latter, means connected to the workpiece supporting means for moving the workpiece along said central axis toward and away from said element, means for rotating said element about its own axis, and means for moving said element in an orbital rotation about the central neutral axis and in polishing engagement with said cavity wall, said means applying a constant predetermined yieldable radial pressure to said element while in orbital engagement with the cavity wall, the means for moving the workpiece along said central axis being operated for reciprocating said workpiece in relation to said rotating, orbiting element for evenly polishing the cavity wall of the workpiece.

3. A mold polishing machine for treating the cavity defining wall of a mold having an end opening comprising a vertical frame, a mold table, means on said table for fastening a mold for treatment with its end opening vertically disposed, power means connected to said table operable for reciprocally moving it vertically, a first rack, a second rack, a spindle carrier pivotally connected to both the first and second racks for rotation on parallel axes, a polishing spindle having an abrasive polishing surface at its outer end and rotatably mounted on said carrier, means for pivotally attaching the first rack to said frame for rocking movement on an axis transverse to said parallel axes, a rotary drive means connected to rotate said spindle about its axis, a spindle drive arm end-connected to the second rack, an orbital drive means connected to said arm for orbitally driving said spindle comprising a drive shaft, means for rotating the shaft, a slide member swivel connected to said drive arm, a radial slide-guide on said shaft moveably supporting said slide member and rotated by said shaft, said slide member and guide cooperating to provide a variable crank, means connected to said slide member for moving it rectilinearly on said guide and thereby varying the crank radius for the drive arm with respect to the axis of the shaft, and means connected to said last-mentioned means for applying thereto a predetermined radial force tending to increase said crank radius, thereby holding the polishing spindle in orbital surface contact on the wall of the cavity.

4. The apparatus defined in claim 3, including means biasing said predetermined radial-force applying means operable selectively for moving the slide member so as to reduce the crank radius substantially to zero, and thereby center said spindle and discontinue orbital motion of the latter.

5. The apparatus defined in claim 4, wherein said biasing means comprises a fluid-operated reciprocating motor.

6. The apparatus defined in claim 5, wherein the fluid-operated reciprocating motor comprises a cylinder, piston and piston rod, the latter engaging the slide member, a source of fluid under pressure, a connection from the source to the head end of the cylinder opposite the piston rod, a valve in said connection for alternatively connecting said source to the cylinder for moving the piston rod in one direction and exhausting fluid therefrom, and a spring means connected to the piston rod urging the latter in the opposite direction.

7. The mold polishing machine defined in claim 6, which includes plural spindles mounted on said spindle carrier for simultaneously polishing plural axial cavities of said mold workpiece.

8. A mold polishing machine for treating the cavity defining wall of a mold having an end opening comprising a vertical frame, a mold table, vertical guide means on said frame connected to the mold table for guiding it vertically, means on said table for fastening a mold for treatment with its end opening vertically disposed, power means connected to said table operable for reciprocally moving the mold table vertically, an upper rack, a lower rack, a spindle carrier pivotally connected on horizontal parallel axes to both the upper and lower racks, a polishing spindle rotatably mounted on said carrier, means for pivotally attaching the lower rack to said frame for rocking movement on a horizontal axis transverse to said parallel axes, a rotary drive means connected to said spindle, a spindle drive arm end-connected to the upper rack, an orbital drive means connected to said arm for orbitally driving said spindle comprising a drive shaft, means for rotating the shaft, a variable crank on said shaft connected to the arm, means connected to said variable crank for varying its crank radius with respect to the axis of the shaft, and means connected to said last-mentioned means for applying to it a predetermined force tending to increase said crank radius, thereby driving the polishing spindle in orbital surface contact on the wall of the cavity.

9. The mold polishing machine defined in claim 8, wherein said plural spindles are mounted in individual spindle carrier elements, each of which are similarly mounted on parallel horizontal upper and lower shafts, corresponding plural horizontal slide elements in both said upper and lower racks, said upper and lower shafts of each spindle carrier element being rotatably mounted a respective slide element, and means for collectively, laterally adjusting the position of upper and lower slide elements in pairs along said racks so as to adjust the spacing between the plural spindles for registry with the respective plural cavities of the workpiece.

10. A mold polishing machine for treating the cavity defining wall of a mold having an end opening comprising a vertical frame, a mold table, means on said table for fastening a mold for treatment with its end opening vertically disposed, power means connected to said table operable for reciprocally moving the mold table vertically, an upper rack, a lower rack, a spindle carrier pivotally connected on horizontal parallel axes to both the first and second racks, a polishing spindle rotatably mounted on said carrier, means for pivotally attaching the lower rack to said frame for rocking movement on a transverse horizontal axis, a rotary drive means connected to said spindle, a spindle drive arm end-connected to the upper rack, an orbital drive means connected to said arm for orbitally driving said spindle comprising a drive shaft member, means for rotating the shaft member, a slide member having a swivel connection to said drive arm, a radial slide-guide on said shaft member moveably supporting said slide member, said slide member and guide cooperating to provide a variable crank, a rack gear on said slide member, a pinion in mesh with the rack and rotatably mounted on said shaft member, a second gear rotatably mounted coaxially with said pinion, an axially disposed element shiftably mounted on said shaft member, a rack segment on said member in mesh with the second gear, a collar attached to said element, a yoke connected to said collar and mounted on a horizontal pivot, said yoke having a lateral arm outwardly of the pivot, a weight suspended from arm, said yoke, element and meshing gears translating motion to said slide for increasing the crank radius of said drive arm connection from the axis of the shaft member, said weight thereby applying a predetermined force for driving the polishing spindle in orbital surface contact on the wall of the cavity.

11. Apparatus for polishing a cavity defining wall of a workpiece comprising a vertical frame, a polishing head including a rotary spindle and a polishing member thereon, means supporting the polishing head on said frame for axial and orbital rotation of the spindle, the latter describing a variable orbital path, drive means connected to the spindle for imparting thereto said axial rotation, a separate drive means for imparting to the spindle a variable orbital rotation comprising a shaft, a variable crank means connected to said spindle and mounted for rotation about the axis of said shaft, a motor, a drive connection from the motor to said shaft for rotating the latter, means connected to said crank means for varying its crank radius thereby varying the orbital rotation of said polishing member, a workpiece supporting table, vertical guide means on said frame connecting said table thereto for vertical movement, means on said table for fastening the cavity-defining workpiece to be polished, and power means connected to the workpiece supporting table and including control means for reciprocating said table and the workpiece with respect to the polishing member, the latter being driven in its orbital path in peripheral contact with the cavity-defining surface of said workpiece.

12. The apparatus defined in claim 11, wherein the power means comprises a fluid pressure operated, vertically disposed motor having a cylinder, piston and piston rod, this latter being connected to said table.

13. The apparatus defined in claim 12, wherein the control means comprises a fluid pressure source, a reversing valve intermediate said source and motor and connecting the source alternatively to opposite ends of the cylinder, an actuator connected to the valve and operable for shifting said valve between its alternative settings, first and second switches mounted in vertically spaced relation on the frame and connected to the actuator to operate the latter, and a member connected to the table and moved vertically thereby and which alternatively engages said first and second switches, the latter being operated in response to table movement in opposite directions to provide automatic, cyclical reciprocating movement of the motor by sequential engagement of said switches.

14. The apparatus defined in claim 13, wherein said switches each have an adjustable mounting on the vertical frame and include a clamp means for locking them thereon in predetermined positions in vertically spaced relationship, whereby the length of reciprocating stroke of the motor may be varied in accordance with the axial length of cavity surface to be polished.

15. The apparatus defined in claim 11, wherein the workpiece supporting table includes an underlying housing, an upwardly directed spray nozzle in said housing and adapted to communicate with each cavity of the workpiece on said table for applying a liquid onto each said cavity defining surface, a source of said liquid, a pump means for supplying said liquid from the source and connected to said nozzle, and a connection between said housing and said source for recirculation of said liquid.

16. In an apparatus for polishing a cavity defining wall of a workpiece having a support means for the workpiece, a polishing head including a rotary spindle and a polishing member thereon adapted for insertion into said cavity, and means for moving the workpiece relative to the polishing member in a direction axially of the cavity, the combination of a means supporting the polishing head for axial and orbital rotation of the polishing member, comprising first and second horizontal racks disposed parallel and in vertically spaced relationship, said first rack being pivotally mounted on a longitudinal, horizontal axis, a rotary drive member including a variable crank means connected to said second rack and rotated by said drive member, a spindle carrier element rotatably housing said spindle, means for rotatably mounting said carrier element on each said first and second racks including axially spaced apart, parallel pivots, and separate drive means connected to the spindle for imparting thereto said axial rotation to the spindle and polishing member.

17. The apparatus defined in claim 16, which includes plural polishing heads, their supporting means having said first and second racks which are provided with longitudinal slideways and means mounting each carrier element on said first and second racks which comprise corresponding individual slide elements carried in said slideways of each said racks, each of the polishing head spindles having a spindle carrier element that is pivotally mounted by its said spaced apart, parallel pivots on one of said individual slide elements of each of the first and second racks, respectively, and means connected to each of the individual slide elements in said first and second racks for adjustably shifting them longitudinally of said racks, thereby adjusting spacing between said plural spindles.

18. The apparatus defined in claim 17, wherein the means for shifting the slide elements comprises plural sets of shafts each shaft having a pinion and each set having a pair of said shafts rotatable respectively in said first and second racks, a rack segment on each of said slide elements and in mesh with a pinion of one of said sets of pinions, and a gear and chain connection between each set of shafts, whereby rotation of a shaft of one of said sets provides parallel sliding movement of the slide elements in said racks.

19. Apparatus for polishing a cavity defining wall of a workpiece comprising a vertical frame, a mold table mounted for vertical movement along said frame, a reciprocating motor drive means connected for moving said table on the frame, a rotary spindle and polishing element on its outer end, spindle carriage means mounting the spindle for rotation about its own axis and an orbital rotation, yieldable support means mounting said carriage on said frame for vertical yielding movement, a motor drive means for independently axially rotating said spindle, a motor drive means for independently orbitally rotating said spindle, a normally closed switch on said frame and connected in the power circuit of at least one of said motor drive means, and a switch actuating device connected to said carriage means engageable with said switch for opening the latter and breaking the said motor drive means power circuit upon a predetermined vertical yielding movement of said carriage means on said frame, whereby physical interference between the spindle and the workpiece will stop the said motor drive means.

20. The apparatus defined in claim 19, wherein yieldable support means comprises a pair of trunnion carriage brackets connected to said spindle carriage means, vertical posts on said frame shiftably supporting said brackets, spring means compressed between each post and its said bracket opposing vertical movement of the latter on the former, the switch actuating device comprising a lug on one of said brackets engageable with said switch by vertical movement of the bracket on said post.

21. A polishing machine for treating the cavity defining wall of a metallic workpiece comprising a vertical frame, a workpiece support table, vertical guide means on said frame connected to the mold table for guiding it vertically, motor drive means connected to said table and operable for reciprocally moving the mold table vertically, an upper rack, a lower rack, an elongated polishing spindle having a portion of an electrically conducting material rotatably mounted in a spindle carrier element, the latter being pivotally connected on horizontal parallel axes to both the upper and lower racks, means for pivotally attaching the one of said racks to said frame for rocking movement on a horizontal axis transverse to said parallel axes, said means including an electrical insulation that electrically isolates the spindle with respect to the workpiece and its support table, a motor drive means connected to rotate said spindle about its axis, a polishing member attached to the outer end of the spindle and electrically insulated from said spindle, an orbital motor drive means connected to the other of said racks for orbitally driving said spindle and its polishing member in orbital surface contact with the wall of said cavity, a normally closed relay in the power circuit of at least one of said motor drive means, said relay including a coil connected in a circuit to an electrical source, said circuit also including said electrically conducting spindle portion and the workpiece, the circuit being closed by an electrical contact between said spindle portion and the workpiece such as by way of a physical interference between said spindle portion and the workpiece during polishing the latter, whereupon the relay coil is energized and said motor drive means power circuit is broken to stop said motor drive means.

References Cited in the file of this patent
UNITED STATES PATENTS

| | | |
|---|---|---|
| 2,466,359 | Beverlin | Apr. 5, 1949 |
| 2,489,722 | Reich | Nov. 29, 1949 |
| 2,559,180 | Victory | July 3, 1951 |
| 2,603,040 | Durkee | July 15, 1952 |